(12) United States Patent
Fulkerson et al.

(10) Patent No.: US 10,319,405 B2
(45) Date of Patent: Jun. 11, 2019

(54) OVERLAP DETECTION FOR MAGNETIC DISKS

(71) Applicant: Seagate Technology LLC

(72) Inventors: Chris R. Fulkerson, Longmont, CO (US); Abhay T. Kataria, Longmont, CO (US)

(73) Assignee: Seagate Technologies LLC, Cupertino, CA (US)

(*) Notice: Subject to any disclaimer, the term of this patent is extended or adjusted under 35 U.S.C. 154(b) by 0 days.

(21) Appl. No.: 15/938,357

(22) Filed: Mar. 28, 2018

(65) Prior Publication Data

US 2018/0336925 A1 Nov. 22, 2018

Related U.S. Application Data

(63) Continuation of application No. 15/599,265, filed on May 18, 2017, now Pat. No. 9,997,192.

(51) Int. Cl.
| | |
|---|---|
| *G11B 19/04* | (2006.01) |
| *G11B 20/10* | (2006.01) |
| *G11B 20/12* | (2006.01) |
| *G11B 20/18* | (2006.01) |

(52) U.S. Cl.
CPC ...... *G11B 19/041* (2013.01); *G11B 20/10009* (2013.01); *G11B 20/1217* (2013.01); *G11B 20/18* (2013.01); *G11B 2020/10898* (2013.01); *G11B 2020/1869* (2013.01)

(58) Field of Classification Search
None
See application file for complete search history.

(56) References Cited

U.S. PATENT DOCUMENTS

| | | | | |
|---|---|---|---|---|
| 5,523,903 | A | * | 6/1996 | Hetzler ................ G11B 5/5526 360/48 |
| 6,950,967 | B1 | * | 9/2005 | Brunnett ............ G06F 11/2221 360/53 |
| 7,463,441 | B2 | | 12/2008 | Cho et al. |
| 7,747,907 | B2 | | 6/2010 | Olds et al. |
| 8,014,097 | B1 | | 9/2011 | Sanvido |
| 8,331,053 | B2 | | 12/2012 | Hobbet |
| 8,806,117 | B2 | | 8/2014 | Islam et al. |
| 9,099,155 | B1 | * | 8/2015 | Kataria ................ G11B 27/36 |
| 9,110,841 | B1 | | 8/2015 | Fulkerson et al. |
| 9,383,923 | B1 | | 7/2016 | Malina |
| 9,997,194 | B1 | * | 6/2018 | Farhan ............... G11B 20/1217 |
| 2002/0080508 | A1 | | 6/2002 | Alex |
| 2003/0007269 | A1 | | 1/2003 | Alex |

(Continued)

*Primary Examiner* — Tan X Dinh
(74) *Attorney, Agent, or Firm* — FisherBroyles LLP; Gregory T. Fettig

(57) ABSTRACT

Embodiments described herein provide an apparatus that is operable with a storage system. The storage system includes a controller operable to assign a pointer to a first track of a magnetic disk when data is written to the first track. The pointer points to the end of the data in the first track. The controller is also operable to detect a successive write to an earlier written portion of the first track, to update a location of the pointer based on the successive write to the earlier written portion of the first track, to increment a write count of the first track based on the successive write to the earlier written portion of the first track, and to rewrite a track adjacent to the first track when the write count breaches a threshold number.

20 Claims, 9 Drawing Sheets

(56) References Cited

U.S. PATENT DOCUMENTS

| | | |
|---|---|---|
| 2004/0017629 A1 | 1/2004 | Lamberts et al. |
| 2004/0047062 A1 | 3/2004 | Alex |
| 2006/0066971 A1 | 3/2006 | Alex et al. |
| 2012/0014013 A1 | 1/2012 | Bandic et al. |
| 2012/0162809 A1 | 6/2012 | Iida |
| 2014/0071559 A1 | 3/2014 | Toda et al. |
| 2017/0132140 A1* | 5/2017 | Lin .................. G06F 12/00 |

* cited by examiner

OVERLAP DETECTION FOR MAGNETIC DISKS

CROSS REFERENCE TO RELATED APPLICATIONS

This patent application is a continuation patent application claiming priority to, and thus the benefit of an earlier filing date from U.S. patent application Ser. No. 15/599,265 (filed May 18, 2017), the entire contents of which are hereby incorporated by reference.

BACKGROUND

Disk drives typically include one or more sliders configured with read and write heads. An actuator/suspension arm holds a slider above a magnetic disk. When the magnetic disk rotates, air flow generated by the rotation of the magnetic disk causes an air bearing surface (ABS) of the slider to fly at a particular height above the magnetic disk. As the slider flies on the ABS, a voice coil motor (VCM) moves the actuator/suspension arm to position the read and write heads over selected tracks of the magnetic disk.

As the technology has advanced, data densities have increased and track widths and separations have narrowed considerably. In fact, track widths and separations have narrowed so much that writing to one track can affect or "overlap" the data stored on adjacent tracks, a phenomena generally referred to as Adjacent Track Interference (ATI) or Side Track Erasure (STE). As such, Directed Offline Scans (DOS) are periodically performed to identify data degradation on the tracks resulting from these overlap conditions. If the data of a particular track is degrading, the track is re-written. Although useful, DOSs can be quite intensive due to the time to verify the track. And, this can impact the overall performance of the disk drive.

SUMMARY

Embodiments described herein provide for mitigating ATI and STE. In one embodiment, an apparatus is operable with a disk drive and includes a memory device operable to store a plurality of bit sets. Each bit set identifies a track and a sector of the disk drive and a number of times that the track of the disk drive has been written. A controller of the disk drive is operable to increment the number when the track is written. Each bit set comprises a number of bits that is established according to track location of the disk drive.

In another embodiment, the apparatus includes a controller operable to assign a pointer to a track of a disk drive and a memory device operable to store a write count of the track of the disk drive and to store the assigned pointer. The controllers also operable to direct data to be sequentially written along the track, to identify a sector of the track where a last portion of the data was written, to update the pointer with the identified sector, and to increment the write count when a previously written portion of the track is rewritten.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE DRAWINGS

Some embodiments are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody the principles of the embodiments. Furthermore, any examples described herein are intended to aid in understanding the principles of the embodiments and are to be construed as being without limitation to such specifically recited examples and conditions. As a result, this disclosure is not limited to the specific embodiments or examples described below.

Figure 1:
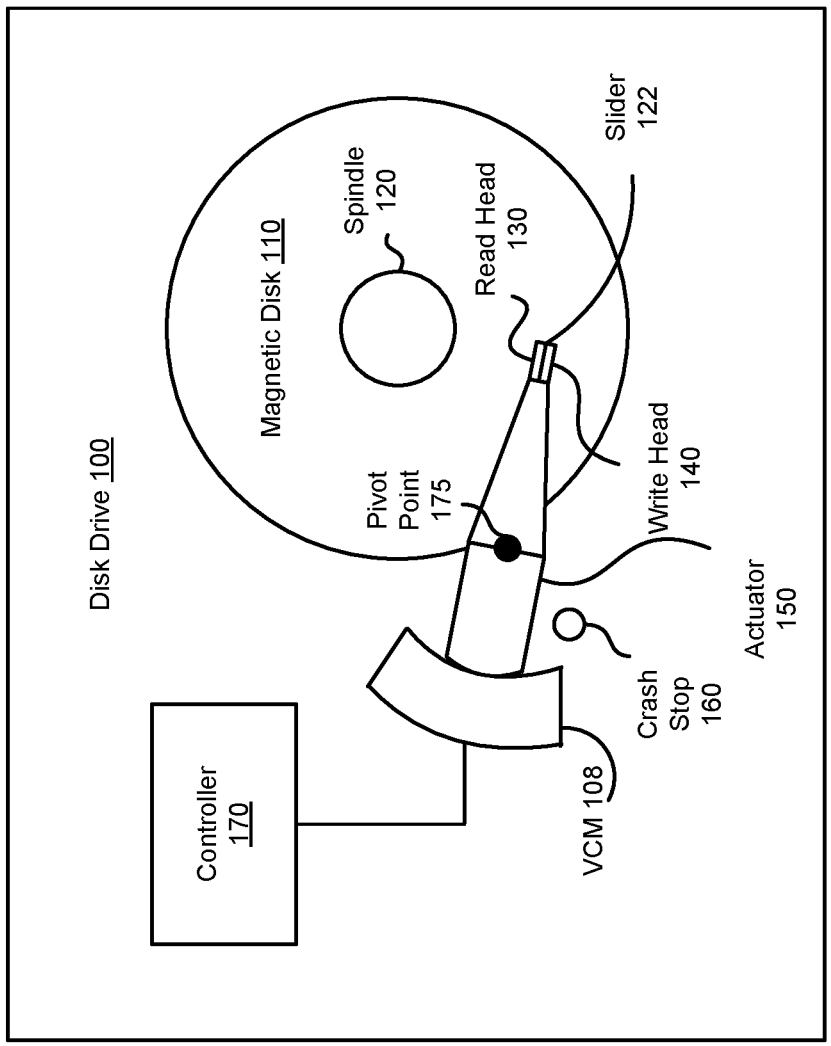
FIG. 1 illustrates an exemplary disk drive system.

FIG. 1 illustrates an overhead view of an exemplary disk drive system 100 including a magnetic disk 110. In the disk drive system 100, the magnetic disk 110 is rotatably mounted upon a motorized spindle 120. A slider 122, having a read head 130 and a write head 140 fabricated thereon, is mounted on an actuator 150 to "fly" above the surface of the rotating magnetic disk 110. The disk drive system 100 also includes a controller 170 that is operable to apply a positional voltage to a VCM 108 to control the position of the actuator 150. The disk drive system 100 may also include an inner diameter crash stop 160 to hold the read head 130 and the write head 140 still at a fixed radius relative to the center of the magnetic disk 110. For example, the actuator 150 pivots about the pivot point 175 against the crash stop 160 to prevent the read head 130 and the write head 140 from traveling past a certain point at the inner diameter of the magnetic disk 110. The disk drive system 100 may include other components (e.g., a spindle motor used to rotate the magnetic disk 110) that are not shown for the sake of brevity.

The disk drive system 100 can be implemented with a desktop computer, a laptop computer, a server, a personal digital assistant (PDA), a telephone, a music player, or any other device requiring the storage and retrieval of digital data. Additionally, certain components within the disk drive system 100 may be implemented as hardware, software, firmware, or various combinations thereof.

Figure 2:
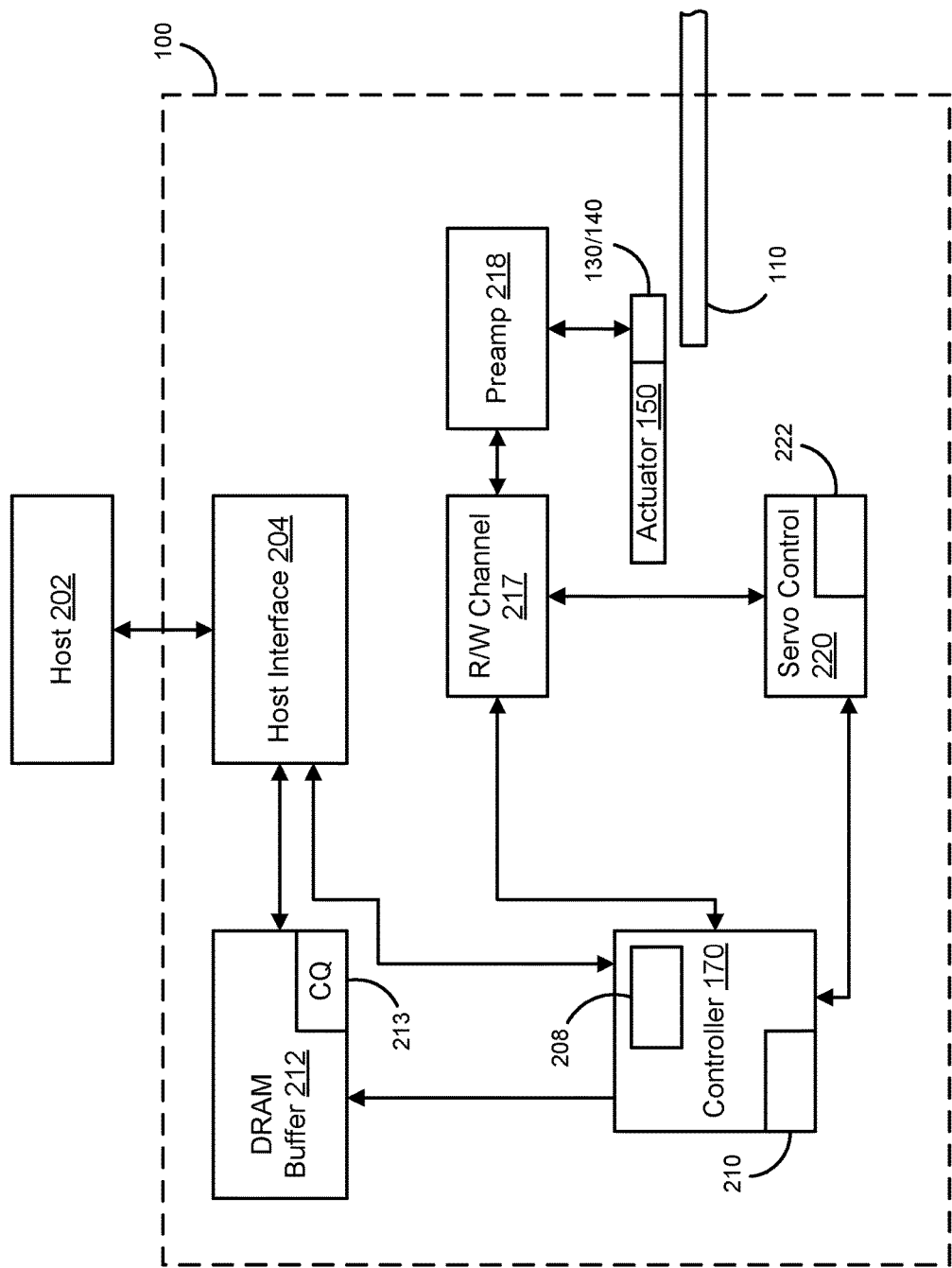
FIG. 2 illustrates an exemplary functional block diagram of the disk drive system of FIG. 1.

FIG. 2 is a functional block diagram of the disk drive system 100. The disk drive system 100 can communicate with a host system 202 via a hardware/firmware based host interface 204. The controller 170 may be configured with memory 208 and a processor 210. A Dynamic Random Access Memory (DRAM) buffer 212 can temporarily store user data during read and write operations and can include a command queue (CQ) 213 where multiple pending access operations can be temporarily stored pending execution. The disk drive system 100 may also include a read/write (R/W) channel 217, which may encode data during write operations and reconstruct user data retrieved from disk(s) 110 during read operations. A preamplifier/driver circuit (preamp) 218 can apply write currents to the head(s) 130/140 and provide pre-amplification of readback signals. A servo control circuit 220 may use servo data to provide the appropriate signaling to the VCM 108 to position the head(s) 130/140 over the disk(s) 110 via the actuator 150. The controller 170 can communicate with a processor 222 of the servo control circuit 220 to move the head(s) 130/140 to the desired locations on the disk(s) 110 during execution of various pending commands in the CQ 213.

Figure 3:
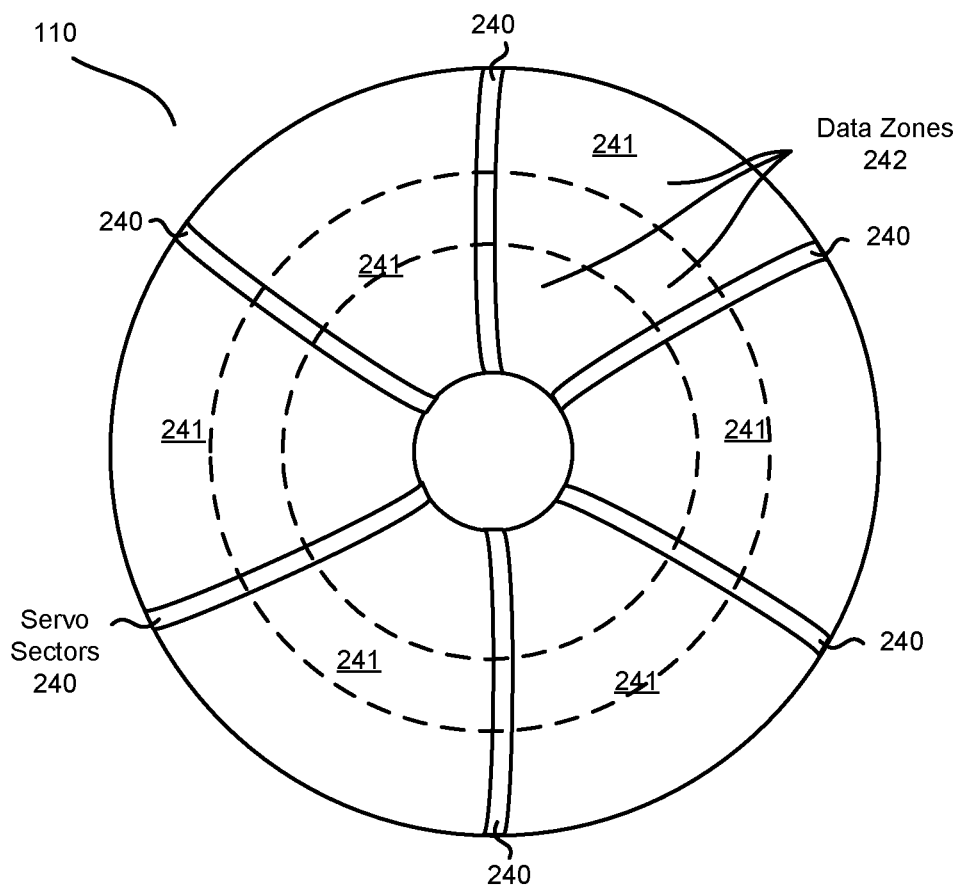
FIGS. 3 and 4 illustrate exemplary magnetic disks comprising servo zones and data regions.
Figure 4:
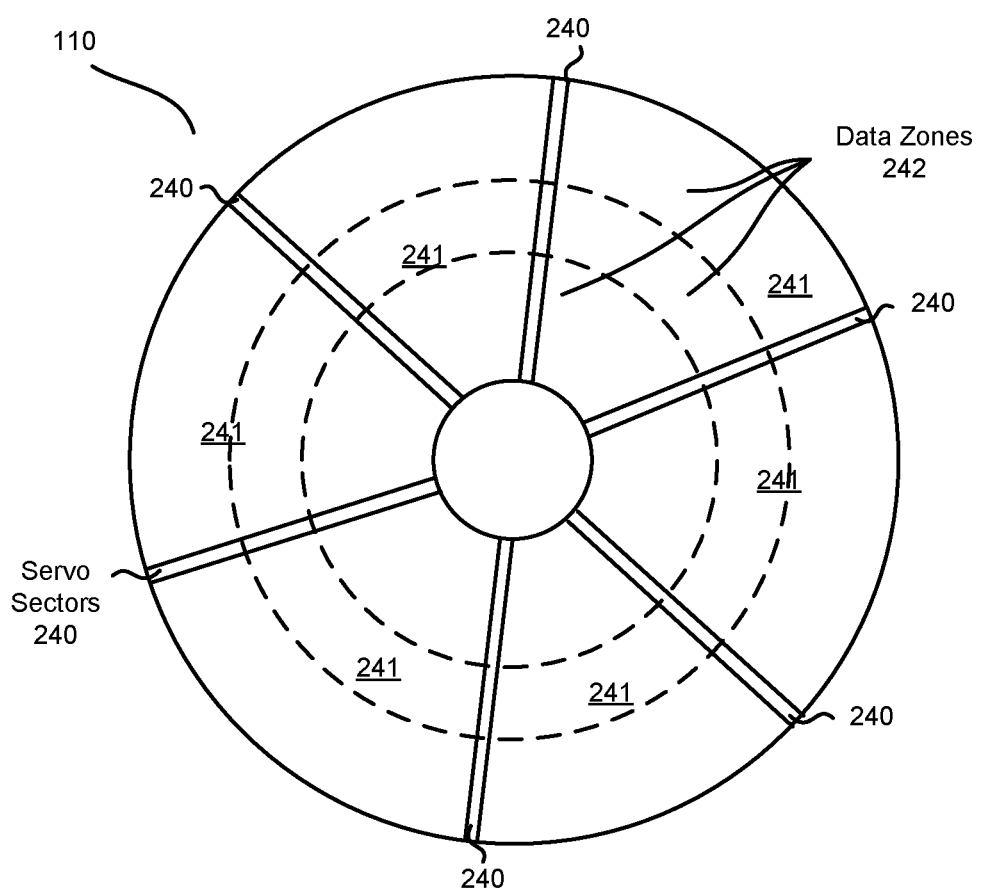

FIG. 3 illustrates an exemplary magnetic disk 110 with arcuate servo sectors 240. FIG. 4 illustrates an exemplary magnetic disk 110 with relatively straight radial servo sectors 240. As can be seen in FIGS. 3 and 4, the data regions 241 of the magnetic disk 110 are separated by the servo sectors 240. Each data zone 242 includes multiple concentric circular data tracks (shown below) with each track being divided into multiple circumferential sectors (i.e., the portions of the data regions 241 separated by the servo sectors 240). Each servo sector 240 has a sector header which includes servo positioning information for recording data on discrete magnetic tracks of the disk 110.

Figure 5:
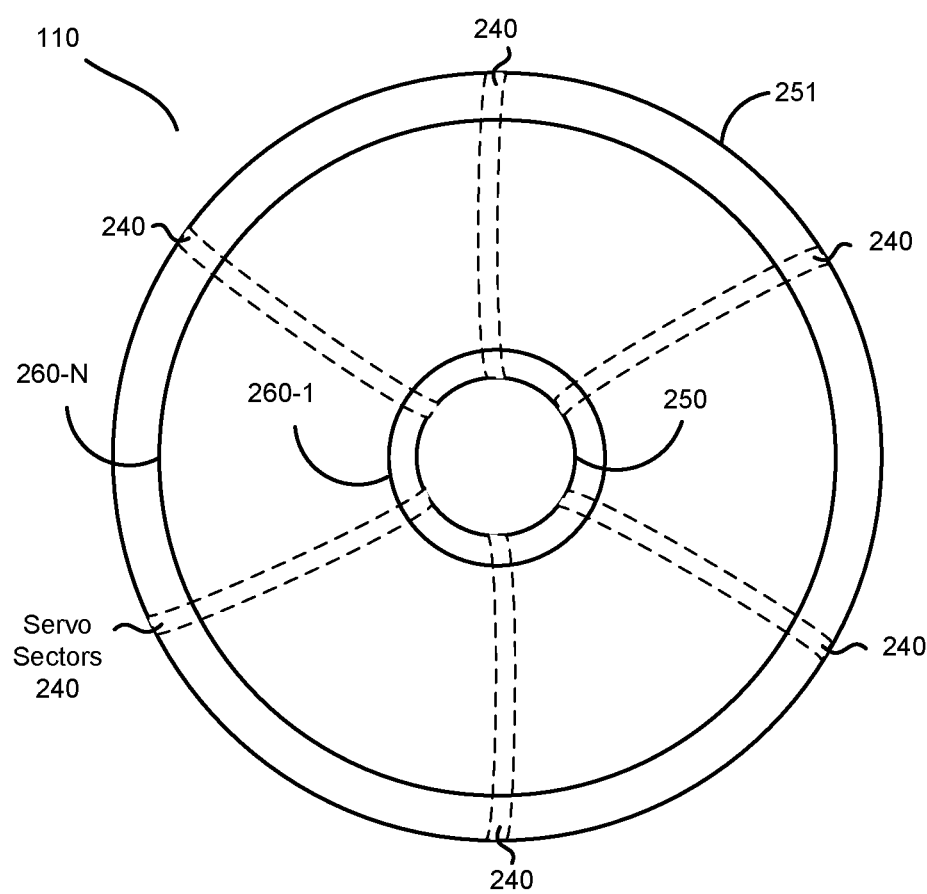
FIG. 5 illustrates an exemplary magnetic disk comprising tracks for writing data.

In whatever configuration, the tracks 260-1-260-N of the magnetic disk 110 span from the inner diameter 250 to the outer diameter 251 of the magnetic disk 110 where data is written, as illustrated in FIG. 5 (wherein the reference number "N" indicates an integer greater than 1 and not necessarily equal to any other "N" reference number use herein). Specific data or locations on the disk 110 can be identified with a sector identification ("sector ID") or sector number, and a track identification ("track ID") or track address. This sector ID and track ID are typically part of the servo data located in the servo sectors 240 and used to position the actuator 150, and thus the read/write head 130/140 over the disk 110. During operation, as the magnetic disk 110 spins, the read head 130 can read the servo data and use the servo data to move the read/write head 130/140 over specific tracks 260 to read and write user data, such as movie files, music files, digital documents, etc.

As disk drive areal density increases, achieving the desired reliability at the target track spacing becomes more challenging due to possible imperfections in the shape of the magnetic field created by the write head 140. When the drive performs repeated writes at the same location, the stray field generated by these imperfections may result in a gradual erasure of nearby tracks (i.e., ATI/STE). For example, ATI is the stray field of the write head 140 affecting tracks 260 adjacent to the target write track 260. STE generally refers to flaws in the write head's 140 shape causing erasure to more distant tracks 260 without necessarily affecting the tracks 260 in between.

Figure 6:
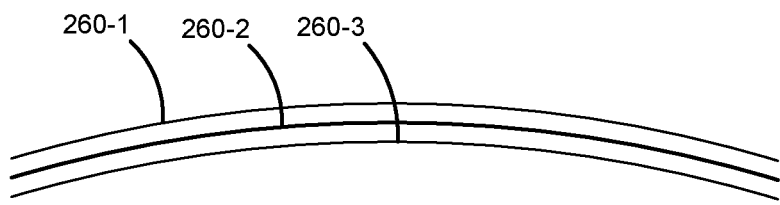
FIG. 6 illustrates exemplary tracks of the magnetic disk.

For instance, writing to the track 260-2 numerous times between writing to the tracks 260-1 and 260-3 may cause the data in the tracks 260-1 and 260-3 to degrade beyond error correction capabilities (FIG. 6). In order to mitigate these erasure effects, tracks 260 can be periodically refreshed (e.g. rewritten) when a pre-determined number of repeated writes have occurred to nearby tracks 260.

Refreshing a track 260 can be accomplished by performing a directed offline scan (DOS) on the tracks 260-1 and 260-3 once the threshold number of writes to the nearby track 260-2 has been reached. A DOS may involve reading the track 260, for example with the read head 130, using a lower error correction tolerance than during normal read operations. For example, when the tracks 260 are read during normal read operations, some errors can be detected and corrected via error correction codes. Reading the tracks 260 with a lower level of error correction allows the degradation to be detected before the data becomes unreadable.

If the track 260 is still readable with the lower level error correction, the data quality for the track 260 may not have degraded enough to warrant rewriting. If, however, the track 260 is unreadable with the lower error tolerance, the DOS may involve reading the track 260, applying normal error correction techniques, and then rewriting the track 260 to refresh the data quality. DOS scanning and rewriting uses drive resources, so it is generally beneficial in terms of a drive's performance to accurately track data writes, and perform DOS scans when it is likely that a track 260 needs to be refreshed. Previous systems forced refreshing/rewriting of the track when a track was sufficiently degraded.

That is, without knowing when to perform a DOS, DOSs may be scheduled too often or too late. For example, scheduling a DOS on one track without knowing how often an adjacent track has been written may result in an unnecessary DOS because the data has not degraded beyond lower level error correction capabilities. Alternatively, the adjacent track may have been written to so much that the track of the subject DOS has degraded beyond normal error correction capabilities.

Accordingly, the controller 170 counts how often tracks have been written so that they may set a threshold for DOSs. When a DOS write count threshold is exceeded, the controller 170 may direct data to be read from the disk 110 and checked for errors to determine whether to refresh the data. Information on write counts for DOS can be stored in, for example, the memory 208, the DRAM 212, the magnetic disk 110, or other memories.

Managing the counts of accumulated writes generally balances between performance and memory utilization. For example, write counts can be maintained on a multi-track or zone level, which would not use large amounts of memory. However, that may result in incrementing the write counter for an entire set of tracks when a sector or two of the tracks may have been affected by a nearby write. That is, writes to a few scattered sectors can cause the write count for the set of tracks to increase repeatedly, while the actual degradation of any particular area of the tracks would be minimal. And, when a write count increases beyond a certain threshold number, each of the tracks in the zone are scheduled for scanning, resulting in overscanning.

Increasing the granularity of the write count may reduce the performance impact that occurs due to overscanning (e.g., scanning of tracks or sectors that have not experienced significant actual ATI/STE). In this regard, track level granularity is generally superior to a multi-track zone level granularity. When any sector of a track is written to some number of times, the adjacent tracks may be scheduled for scanning. Even superior efficiency may be achieved with sector level granularity. Thus, when a sector in a track is written to some number of times, the adjacent sectors may be scheduled for scanning as opposed to the entire track. However, achieving that level of efficiency would generally exceed the amount of available memory in the disk drive system 100 because it would need to store a count for each sector on the drive (e.g., millions of sectors if not billions).

Figure 7:
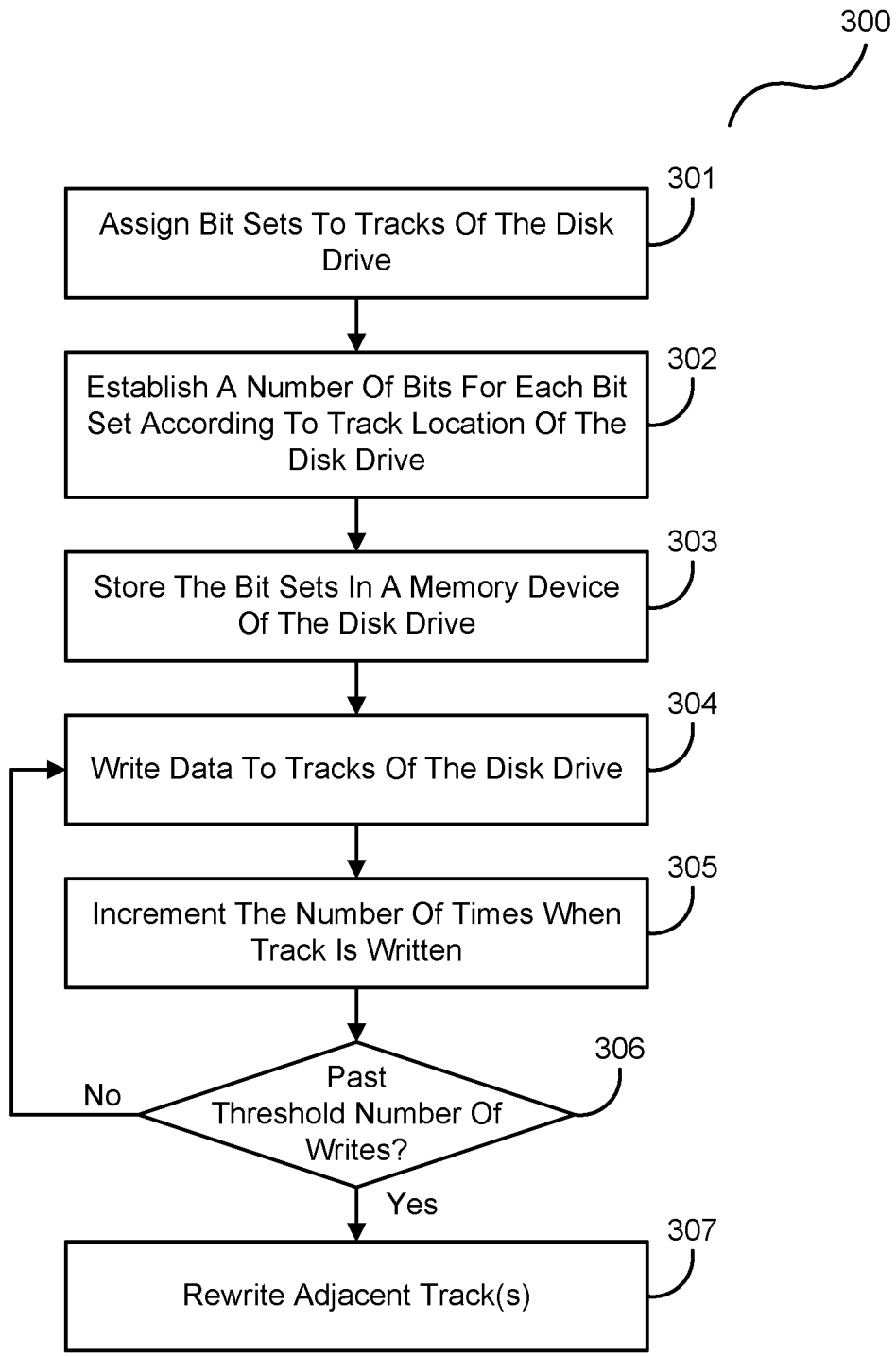
FIGS. 7-9 are flowcharts of exemplary processes of the disk drive system.

One method to achieve granularity performance without overscanning resides in the process 300 of FIG. 7. In this embodiment, bit sets are assigned to individual tracks of the magnetic disk 110, in the process element 301. Each bit set identifies an individual track of the magnetic disk 110. Each bit set may also be operable to identify individual sectors within a given track.

A number of bits is established for each bit set according to the track location of the disk drive system 100, in the process element 302. That is, the number of bits allocated per track to identify that track 260, a sector of that track 260, and to count the number of times that track 260 has been written to vary based on the location of the track 260 on the magnetic disk 110. These bit sets are stored in the memory 208 of the controller 170 of the disk drive system 100, in the process element 303.

During operation of the disk drive system 100, write input/outputs (I/Os) cause data to be written at various sectors of tracks 260 of the magnetic disk 110, in the process element 304. The controller 170 increments the number of times that a track 260 has been written to (i.e., the write count), in the process element 305. For example, a journal entry relating to a larger contiguous data file may be written to the same sector of the track numerous times. In this regard, the controller 170 may increment the number of times that track 260 has been written to. However, when the data is being written to consecutive sectors on a track 260, such as the case of larger contiguous data files, the write count to that track 260 increments by one. In other words, writes to different consecutive sectors in the same track 260 do not necessarily increase the write count within the memory 208.

Generally, manufacturers or users will designate a threshold number of writes when a track 260 needs to be scheduled for scanning. This threshold may be based on a variety of factors including, for example, track width of the magnetic disk 110, a priori knowledge of the recording characteristics of the magnetic disk 110, age of the magnetic disk 110, recording characteristics of the write head 140, etc. And, once the threshold number of writes has been reached, in the process element 306, the controller 170 directs the adjacent track or tracks 260 to be rewritten/refreshed, in the process element 307 (i.e., as part of the DOS). Otherwise, the controller 170 continues normal I/O operations, in the process element 304. And, once a track/sector write count has been reached and the adjacent tracks/sectors have been refreshed, the controller 170 then resets the write count of the subject track (e.g., to zero writes).

Figure 8:
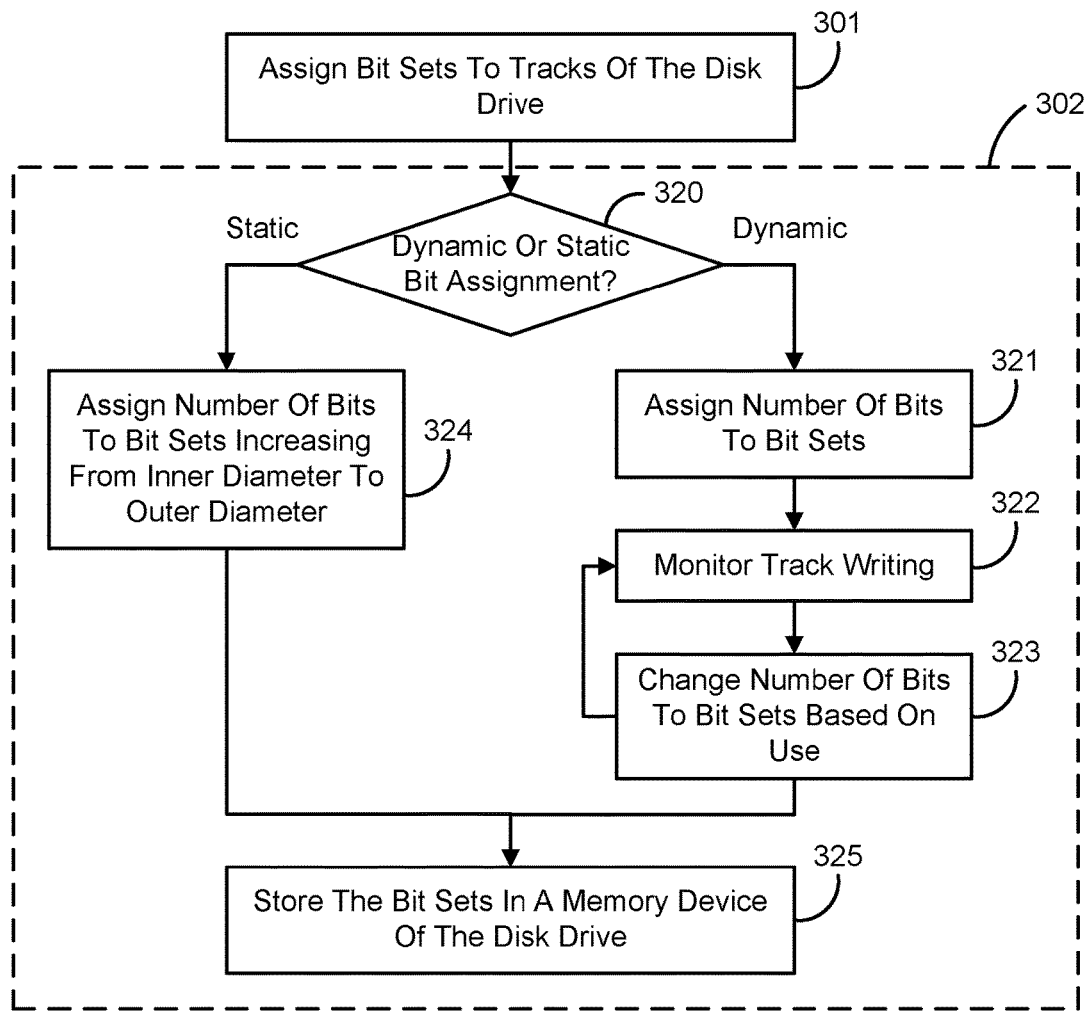

FIG. 8 illustrates one exemplary embodiment of a process element of the process 300 of FIG. 7. More specifically, FIG. 7 illustrates a flowchart of the process element 302 of the process 300 of FIG. 7. In this embodiment, once the bits sets are assigned to the tracks 260 of the disk drive system 100, in the process element 301, the controller 170 determines whether the number of bits being established in the bit sets is to be dynamic or static bit assignments, in the process element 320. For example, the number of bits in each bit set is statically assigned based on the track location of the magnetic disk 110. This may be performed as the number of sectors increases from the inner diameter 250 of the magnetic disk 110 to the outer diameter 251 of the magnetic disk 110, in the process element 324. That is, the number of bits in a bit set is based on the location of the track 260 on the magnetic disk 110, wherein the number of bits of the bit sets increases with tracks 260 towards the outer diameter 251.

To illustrate, one sector of the magnetic disk 110 within a track 260 is generally configured to store the same number of bits as any other sector of the magnetic disk 110 (e.g., 512 bytes, 1024 bytes, 2048 bytes, 4096 bytes, etc.). And, generally speaking, a sector therefore comprises the same physical linear dimension as any other sector on the magnetic disk. Thus, the number of sectors of a track 260 varies based on the location of the track 260 on the magnetic disk 110. So, there are more sectors existing on a track 260 at the outer diameter 251 of the magnetic disk 110 than there are existing on a track 260 at the inner diameter 250 of the disk simply because the diameter of a track 260 at the outer diameter 251 of the magnetic disk 110 is greater than a track 260 closer to the inner diameter 250 of the magnetic disk 110.

One example of how the bits per track may be assigned is illustrated in the following table, Table 1.

TABLE 1

| Track No. | Sectors Per Track | Bits Per Track | | Sector Resolution Per Bit | |
|---|---|---|---|---|---|
| | | Current | New | Current | New |
| 260-N | 1000 | 16 | 24 | 62 | 41 |
| 260-60 | 1000 | 16 | 24 | 62 | 41 |
| 260-51 | 900 | 16 | 24 | 56 | 37 |
| 260-50 | 900 | 16 | 24 | 56 | 37 |
| . | . | . | . | . | . |
| . | . | . | . | . | . |
| . | . | . | . | . | . |
| 260-21 | 600 | 16 | 16 | 37 | 37 |
| 260-20 | 600 | 16 | 16 | 37 | 37 |
| 260-11 | 500 | 16 | 8 | 31 | 62 |
| 260-10 | 500 | 16 | 8 | 31 | 62 |
| 260-2 | 400 | 16 | 8 | 25 | 50 |
| 260-1 | 400 | 16 | 8 | 25 | 50 |
| Total: | | 160 | 160 | | |

In this example, track 260-1 again represents the track closest to the inner diameter 250 of the magnetic disk 110. This track is assigned the lowest number of bits per track at 8 bits per track. Track 260-N represents a track closest to the outer diameter 251 of the magnetic disk 110. Accordingly, track 260-N is allocated the largest number of bits per track at 24 bits. And, as can be seen in Table 1, the tracks 260 in between has a number of bits per track that increases towards the outer diameter 251 as the number of sectors per track also increases towards the outer diameter 251. For example, track numbers 260-20 and 260-21 located in between the outer diameter 251 and the inner diameter 250 comprise 16 bits per track. By improving (e.g., lowering) sectors per bit resolution, DOS overscan is reduced, since writes to included sectors are counted as if they occurred at the same location. For example, in a scenario where there are 10 sectors per bit, one write to each sector results in a DOS write count of 10 despite the fact that no sector has been written more than once.

Alternatively or additionally, the controller 170 may statically assign the same numbers of bits to the bit sets, in the process element 321, although the numbers may be varied according to location of the disk as well. In any case, the controller 170 may monitor the I/Os to determine where tracks are being written and how often, in the process element 322. The controller 170 may then change the number of bits to bit sets based on the use of those tracks 260, in the process element 323. For example, the controller 170 may determine a particular sector of a track 260 is being written to more often than other sectors/tracks 260 of the magnetic disk 110. In this regard, the controller 170 may determine that the I/Os to that sector may pertain to journal entries of a larger contiguous data file. Since the constant writing to that sector may affect adjacent sectors of adjacent tracks 260, the controller 170 may change the number of bits for that sector/track 260, in the process element 323, to increase the write count resolution to that sector.

The controller 170 may continually monitor the track writing of various sectors and tracks 260 (the process element 322) to periodically update the numbers of bits in the bit sets associated with the sectors and tracks 260 (the process element 323). In any case, once the bit sets have their numbers of bits assigned/reassigned, the controller 170 stores the bit sets in and the memory 208, in the process element 325.

Figure 9:
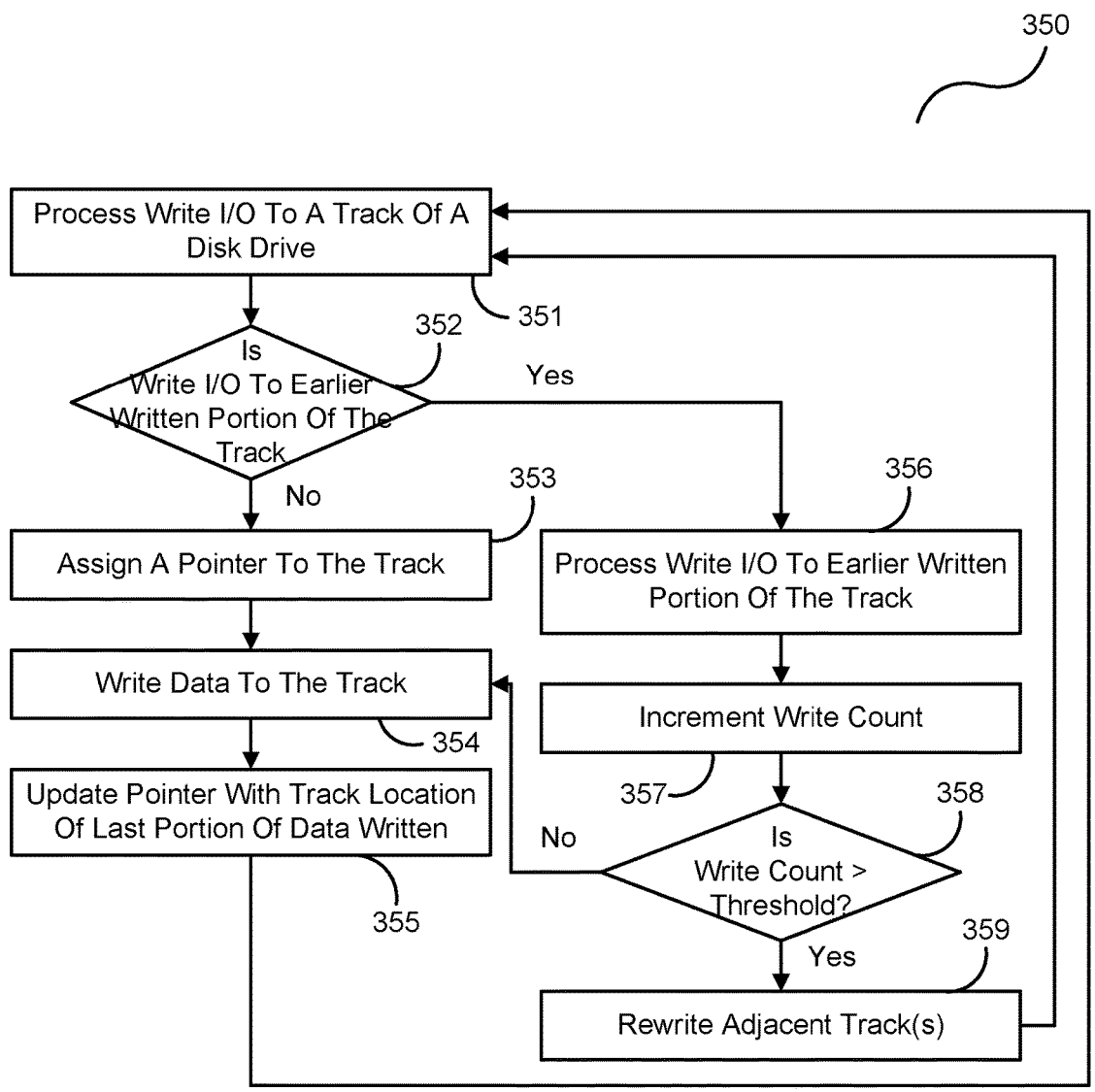

In another embodiment, FIG. 9 illustrates a process 350 where pointers are used to identify or track where writing occurs such that write counts of tracks can be incremented. The process 350 initiates with typical disk drive operations in that the controller 170 processes a write I/O request to a track 260 of the disk drive system 100, in the process element 351. Here, the controller 170 determines whether the write I/O is to an earlier written portion of the track 260, in the process element 352. For example, a write I/O request may be directed to write data to multiple sequential sectors on a track 260 of the magnetic disk 110 as the data may be contiguous in nature. So, if the write I/O is directed to an earlier portion of that track 260 where data has already been written, the controller 170 may process the write I/O request to the earlier written portion of the track 260, in the process element 356. The controller may then increment a write count, in the process element 357. If the write count is greater than (or equal to) some threshold number, in the process element 358, then the controller 170 may perform a DOS operation and rewrite/refresh the adjacent track(s) 260 of the magnetic disk, in the process element 359. The controller 170 then returns to processing write I/O requests, in the process element 351. If the write count is less than (or equal to) the threshold number, then the controller 170 directs the writing of the data from the write I/O request to the track 260, in the process element 354.

If the write I/O request is not directed to an earlier written portion of the track 260, then the controller 170 assigns a pointer to the track 260, in the process element 353. The controller 170 stores that pointer in the memory 208 such that the controller 170 can keep track of the last location of data written to the track 260 of the magnetic disk 110. The controller 170 then writes the data to the track 260, in the process element 354. The controller 170 then updates the pointer with the track location of the last portion of data written to that track 260, in the process element 355. And, the controller 170 continues disk drive operations by processing write I/O request to tracks of the disk drive system 100, in the process element 351.

The embodiments shown and described herein may be combined in various ways to reduce over scanning of the magnetic disk 110 while still mitigating the effects of ATI/STE. For example, the controller 170 may monitor how and where data is being written to the tracks 260 during the process element 354. If the controller 170 determines that the portions of data being written to are relatively small in nature, the controller 170 may determine that an alternative write count increment algorithm may be better suited to ensure that the write counts do not increase so much as to trigger unnecessary DOS operations. One example of such a write count operation, in addition to those disclosed herein, is shown and described in U.S. Pat. No. 9,110,841, the contents of which are hereby incorporated by reference.

We claim:

1. A storage system, comprising:
a controller operable to assign a pointer to a first track of a magnetic disk when data is written to the first track, the pointer pointing to the end of the data in the first track,
the controller being further operable to detect a successive write to an earlier written portion of the first track, to update a location of the pointer based on the successive write to the earlier written portion of the first track, to increment a write count of the first track based on the successive write to the earlier written portion of the first track, and to rewrite a track adjacent to the first track when the write count breaches a threshold number.

2. The storage system of claim 1, wherein:
the controller is further operable to determine that the writes to the first track are to a same location of the previously written location of the first track, and to change how the write count is incremented.

3. The storage system of claim 1, wherein:
the controller is further operable to assign a bit set to the first track that includes a sector identification of the first track and the write count of the first track.

4. The storage system of claim 3, wherein:
a number of bits of a bit set at the inner diameter of the magnetic disk is less than a number of bits of a bit set at the outer diameter of the magnetic disk.

5. The storage system of claim 1, wherein:
the controller is further operable to generate an overlap check bitmask indicating a previously written portion of the first track, to generate a write check bitmask based on the writes to the first track, and to increment the write count based on a comparison of the overlap check bitmask with the write check bitmask.

6. The storage system of claim 1, wherein:
the controller is further operable to reset the write count after the track adjacent to the first track is rewritten.

7. The storage system of claim 1, wherein:
the controller is further operable to read data from the track adjacent to the first track, and to correct the data with an error correction code prior to rewriting the data to the track adjacent to the first track.

8. A method, comprising:
assigning a pointer to a first track of a magnetic disk when data is written to the first track, the pointer pointing to the end of the data in the first track;
detecting a successive write to an earlier written portion of the first track;
updating a location of the pointer based on the successive write to the earlier written portion of the first track;
incrementing a write count of the first track based on the successive write to the earlier written portion of the first track; and
rewriting a track adjacent to the first track when the write count breaches a threshold number.

9. The method of claim 8, further comprising:
determining that the writes to the first track are to a same location of the previously written location of the first track; and
changing how the write count is incremented.

10. The method of claim 8, further comprising:
assigning a bit set to the first track that includes a sector identification of the first track and the write count of the first track.

11. The method of claim 10, wherein:
a number of bits of a bit set at the inner diameter of the magnetic disk is less than a number of bits of a bit set at the outer diameter of the magnetic disk.

12. The method of claim 8, further comprising:
generating an overlap check bitmask indicating a previously written portion of the first track;
generating a write check bitmask based on the writes to the first track; and
incrementing the write count based on a comparison of the overlap check bitmask with the write check bitmask.

13. The method of claim 8, further comprising:
resetting the write count after the track adjacent to the first track is rewritten.

14. The method of claim 8, further comprising:
reading data from the track adjacent to the first track; and
correcting the data with an error correction code prior to rewriting the data to the track adjacent to the first track.

15. A non-transitory computer readable medium comprising instructions that, when executed by a storage controller, direct the storage controller to:
assign a pointer to a first track of a magnetic disk when data is written to the first track, the pointer pointing to the end of the data in the first track;
detecting a successive write to an earlier written portion of the first track;
update a location of the pointer based on the successive write to the earlier written portion of the first track;
increment a write count of the earlier written portion of the first track based on the successive write to the first track; and
rewrite a track adjacent to the first track when the write count breaches a threshold number.

16. The computer readable medium of claim 15, further comprising instructions that direct the storage controller to:
determine that the writes to the first track are to a same location of the previously written location of the first track; and
change how the write count is incremented.

17. The computer readable medium of claim 15, further comprising instructions that direct the storage controller to:
assign a bit set to the first track that includes a sector identification of the first track and the write count of the first track.

18. The computer readable medium of claim 17, wherein:
a number of bits of a bit set at the inner diameter of the magnetic disk is less than a number of bits of a bit set at the outer diameter of the magnetic disk.

19. The computer readable medium of claim 15, further comprising instructions that direct the storage controller to:
generate an overlap check bitmask indicating a previously written portion of the first track;
generate a write check bitmask based on the writes to the first track; and
increment the write count based on a comparison of the overlap check bitmask with the write check bitmask.

20. The computer readable medium of claim 15, further comprising instructions that direct the storage controller to:
reset the write count after the track adjacent to the first track is rewritten.

* * * * *